United States Patent
Kim et al.

(10) Patent No.: US 7,583,464 B2
(45) Date of Patent: *Sep. 1, 2009

(54) APPARATUS AND METHOD COMPENSATING MECHANICAL TOLERANCE OF BRUSHLESS DIRECT CURRENT MOTOR AND RELATED DISK DRIVE

(75) Inventors: Nam-guk Kim, Anyang-si (KR); Kyoung-whan Oh, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 50 days.

This patent is subject to a terminal disclaimer.

(21) Appl. No.: 11/650,420

(22) Filed: Jan. 8, 2007

(65) Prior Publication Data

US 2007/0159709 A1 Jul. 12, 2007

(30) Foreign Application Priority Data

Jan. 12, 2006 (KR) ........................ 10-2006-0003497

(51) Int. Cl.
*G11B 15/46* (2006.01)
(52) U.S. Cl. ............... 360/73.03; 388/803; 318/400.34
(58) Field of Classification Search ........................ None
See application file for complete search history.

(56) References Cited

U.S. PATENT DOCUMENTS 4,893,067 A 1/1990 Bhagwat et al.
5,631,999 A * 5/1997 Dinsmore ................... 388/805
6,560,054 B1 5/2003 Ottesen et al.
6,972,540 B1 * 12/2005 Wang et al. ............. 318/400.34
2004/0012355 A1 * 1/2004 Sosseh et al. ............... 318/439
2005/0127861 A1 6/2005 McMillan et al.

FOREIGN PATENT DOCUMENTS

| JP | 10-312630 | 11/1998 |
| JP | 2000-253688 | 9/2000 |

* cited by examiner

*Primary Examiner*—Jason C Olson
(74) *Attorney, Agent, or Firm*—Volentine & Whitt, PLLC

(57) ABSTRACT

Provided are an apparatus and method for controlling a motor which compensates for a mechanical tolerance of the motor in a case where a feedback sampling frequency increases in order to more precisely control a brushless DC motor. The apparatus for compensating the mechanical tolerance of the brushless DC motor includes: a speed controller calculating a speed error that is a difference between a motor speed measured in control sections and a reference speed using a back electromotive force generated by the motor, and generating a motor control input signal using the speed error of the control section; a moving average calculator calculating a moving average value of the motor control input signals in a predetermined moving average section including recently generated motor control input signal whenever the motor control input signals are generated; and a motor driver generating an electric current for driving the motor corresponding to the moving average value.

18 Claims, 3 Drawing Sheets

APPARATUS AND METHOD COMPENSATING MECHANICAL TOLERANCE OF BRUSHLESS DIRECT CURRENT MOTOR AND RELATED DISK DRIVE

BACKGROUND OF THE INVENTION

1. Field of the Invention

The present invention relates to an apparatus and method adapted to controlling a motor. More particularly, the invention relates to an apparatus and method for precisely controlling a brushless direct current (DC) motor in relation to a mechanical tolerance.

This application claims the benefit of Korean Patent Application No. 10-2006-0003497, filed on Jan. 12, 2006, the subject matter of which is hereby incorporated by reference.

2. Description of the Related Art

Hard disk drives (HDDs) are commonly used within various host devices, such as personal computers (PCs), as data storage devices. In general operation, HDDs allow data to be written to and read from recording medium (e.g., a disk having a surface subject to variation in its magnetic properties) using a magnetic read/write head. Data is stored on conventional disks in terms of bits per inch (BPI)—a recording density defined in relation to the disk's rotational direction, and tracks per inch (TPI)—a recording density defined in relation to the disk's radial direction. Significant research and development efforts are currently being expended to increase data recording density according to both of these definitions. Additionally, commercial demands are increasing for increasingly small HDDs. The increasing miniaturization of HDDs, together with demands for higher data recording densities, require ever finer and more precise mechanisms within HDD structures.

Conventional HDDs commonly rotate constituent their disk(s) at a constant angular velocity using a brushless direct current (DC) motor. As the disk rotates, data is read from or written to it using a magnetic read/write head. As the rotational speed of the disk increases, a feedback sampling frequency used to read/write data must be correspondingly increased to preserve the precision of data access operations.

Conventionally, a spindle motor is used to rotate the disk of an HDD in a precise and well-controlled manner. This is often accomplished using a feedback signal derived from a back electromotive force generated by the spindle motor. This approach does not require the use of an additional sensor which reduces production costs. A speed estimation integral to the feedback control loop may be derived from a phase signal provided by a driving circuit associated with the motor. The phase signal may be generated as the back electromotive force generated by the motor passes a zero point and the corresponding phase of the back electromotive force changes accordingly. In the context of this approach, the phase of the back electromagnetic force will change in accordance with the maximum number of magnetic poles associated with the motor as it rotates the disk. Therefore, if the motor is synchronously controlled in relation to such phase changes, the resulting sampling rate will correspond to the motor's maximum number of magnetic poles during a given time period.

However, if the sampling frequency is increased, the resulting changes in the interval of magnetic poles due to the mechanical tolerance of a permanent magnet within the motor will negatively affect the system's performance. This causes a false error when the measured speed is used as a feedback signal to the controller, and thus, resonance may be generated in the spindle motor.

SUMMARY OF THE INVENTION

Embodiments of the invention provide an apparatus and method compensating for a mechanical tolerance of a brushless direct current (DC) motor, thereby reducing the prevalence of false errors associated with phase signals generated due to the mechanical tolerance. Such an approach to the design and control of brushless DC motors is well adapted to HDDs.

In one embodiment, the invention provides an apparatus compensating for a mechanical tolerance of a motor, the apparatus comprising; a speed controller adapted to calculate a speed error based on a difference between a measured motor speed in each one of a plurality of control sections using a back electromotive force generated by the motor and a reference speed, and further adapted to generate a plurality of motor control input signals in relation to the speed error, a moving average calculator adapted to calculate a moving average value of the plurality of motor control input signals over a moving average section including recently generated motor control input signals whenever the motor control input signal is generated, and a motor driver adapted to generate a driving motor current in relation to the moving average value.

In another embodiment, the invention provides a method of compensating for a mechanical tolerance of a motor, the method comprising; generating a plurality of motor control input signals using a back electromotive force generated by the motor, calculating a moving average value of the motor control input signals in a moving average section including recently generated motor control input signals whenever the motor control input signal is generated, and driving the motor using an electric current corresponding to the moving average value.

In another embodiment, the invention provides a hard disk drive (HDD) comprising; a disk storing data, a spindle motor rotating the disk and generating a back electromotive force, a spindle motor controller adapted to generate, spindle motor control input signals adapted to rotate the disk at a constant speed in relation to the back electromotive force, a moving average value of the spindle motor control input signals in a moving average section including recently generated spindle motor control input signal whenever the spindle motor control input signal is generated, and a spindle motor driver adapted to generate driving motor current corresponding to the moving average value.

DESCRIPTION OF EMBODIMENTS

Figure 1:
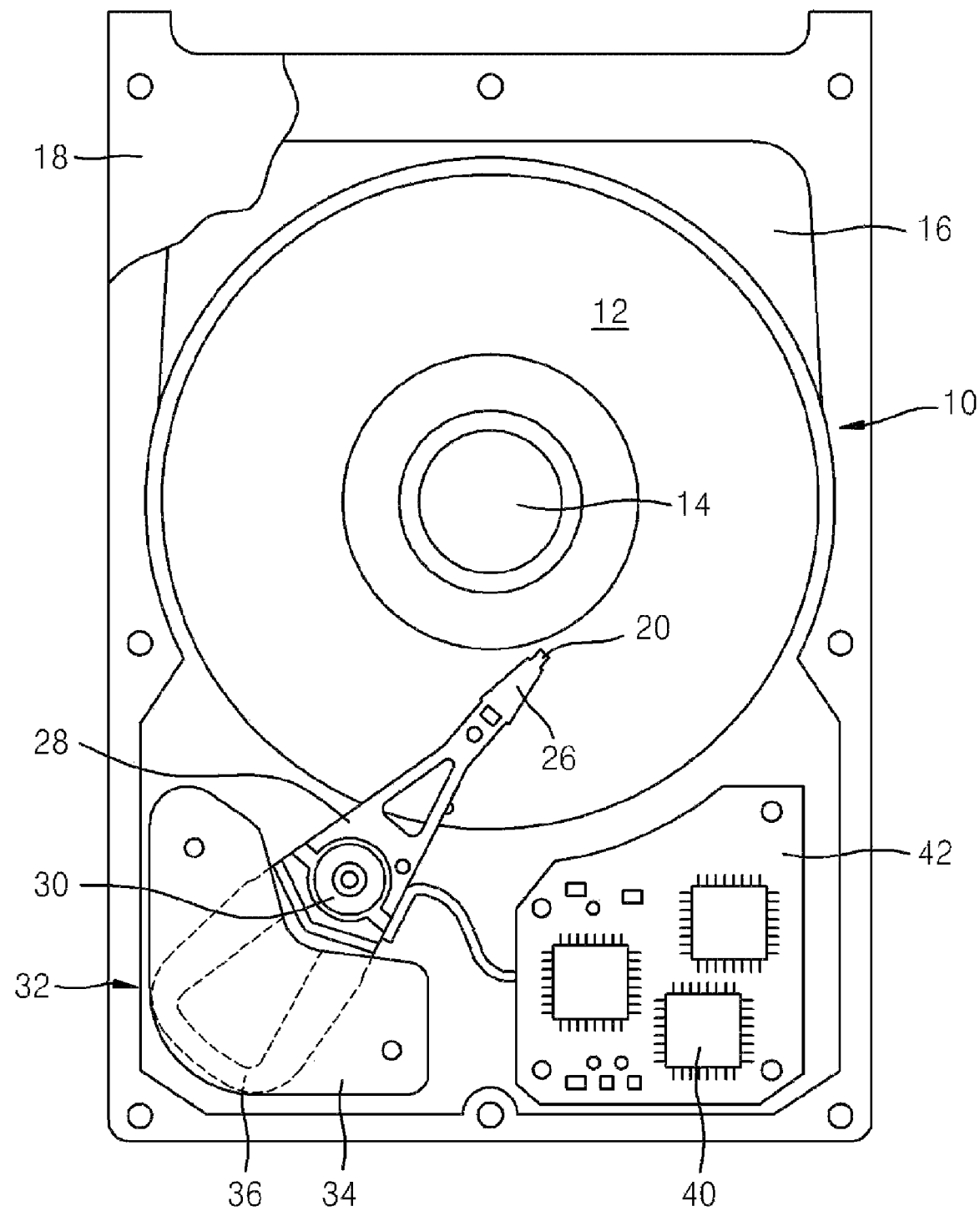
FIG. 1 is a plan view of a disk drive according to an embodiment of the present invention.

FIG. 1 is a block diagram of a hard disk drive (HDD) 10 according to an embodiment of the present invention. HDD 10 may include one or more magnetic disks 12 rotated by a spindle motor 14. (Only a single disk 12 will generally be referenced hereafter, bearing in mind that multiple disk designs, as well as single disk designs are contemplated by the present invention). Spindle motor 14 is installed on a substrate 16. HDD 10 further includes a cover 18 protecting disk 12.

HDD 10 includes a one or more read/write heads 20 floating over disk 12. Each read/write head 20 may includes a write element and/or a read element, either commonly or separately provided. The write element (or write head) is adapted to selectively magnetize disk 12 in order to write data onto disk 12. The read element (or read head) is adapted to sense a magnetic field associated with disk 12 in order to read recorded data. In one embodiment, a read element may take the form of a magneto-resistance element having a resistance that changes linearly with respect to a detected magnetic flux.

Each read/write head 20 may be attached to a flexure arm 26 associated with a head gimbal assembly (HGA). For example, flexure arm 26 may be attached to an actuator arm 28 loaded onto substrate 16 by a bearing assembly 30. A voice coil 32 is coupled to a magnetic assembly 34 in order to supply electric current to a voice coil motor (VCM) 36. When the electric current is supplied to voice coil 32, mechanical torque rotates actuator arm 28, thereby moving read/write head 20 over disk 12.

HDD 10 includes a plurality of integrated circuits (ICs) 40 mounted on a printed circuit board (PCB) 42. ICs 40 and associated components may be connected to voice coil 32, read/write head 20, and spindle motor 14 using electric wires (not shown).

Figure 2:
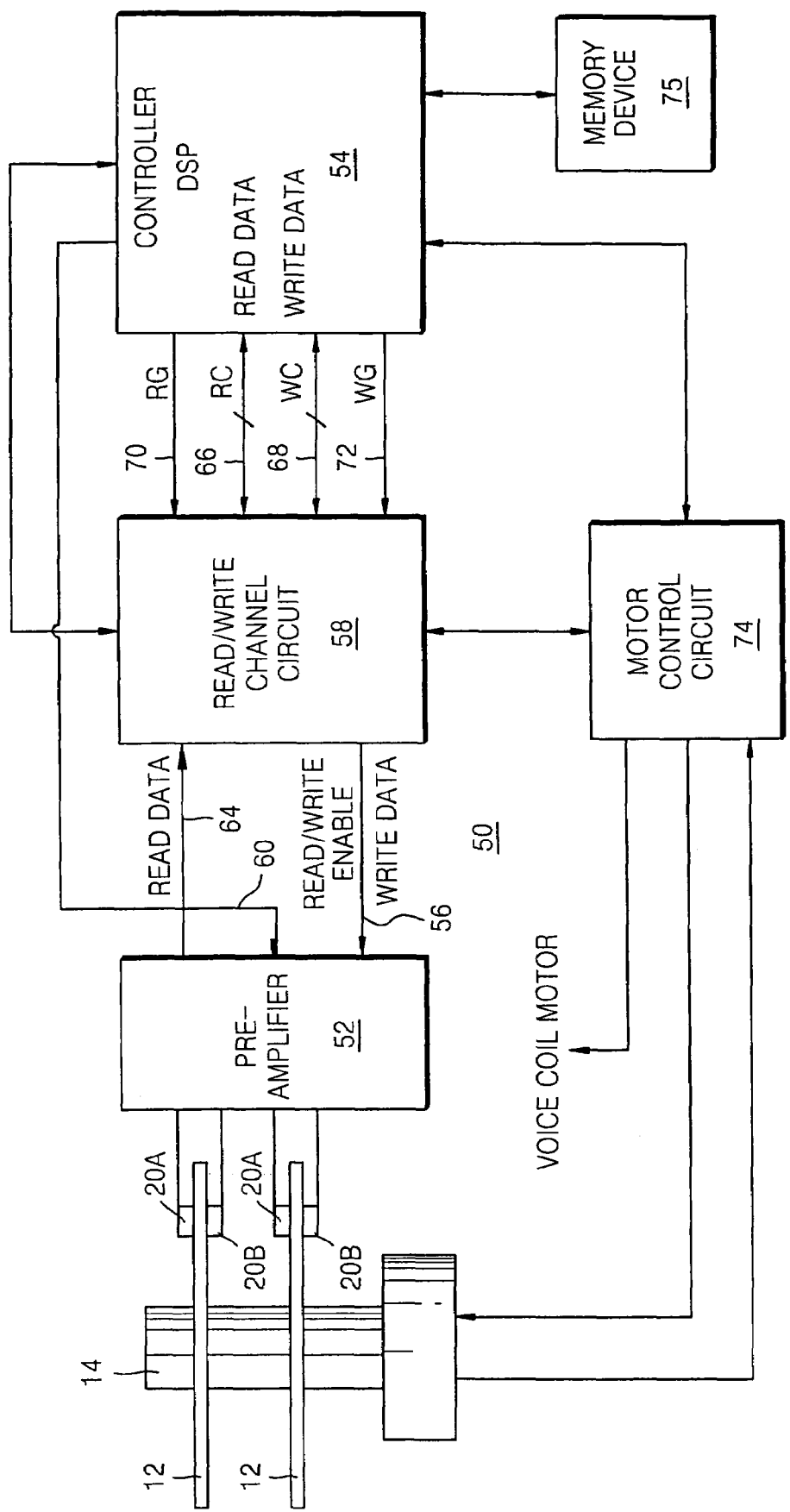
FIG. 2 is a block diagram of a disk drive, to which an apparatus and a method for compensating for a mechanical tolerance of a brushless direct current (DC) motor is applied according to an embodiment of the present invention.

FIG. 2 illustrates an electric circuit 50, which in certain embodiments might be implemented by one or more of ICs 40, is adapted to perform read operations in relation to data stored on one or both of disks 12. Electric circuit 50 comprises in the illustrated embodiment a pre-amplifier 52 connected to read/write heads 20. (The illustrated example of FIG. 2 shows two disks 12 and multiple read/write heads 20A/20B). Pre-amplifier 52 is connected to a read data channel 64 communicating a read signal related to data read from disk 12, and a write data channel 56 communicating a write signal related to data to be written to disk 12. The read signal is provided to, and the write signal is provided from a read/write channel circuit 58. Pre-amplifier 52 also receives a read/write enable signal directly from a controller 54. This signal controls read/write operations to disk 12. Controller 54 may be implemented as a conventional digital signal processing circuit adapted to execute controlling software stored in a memory associated therewith (e.g., non-volatile, or ROM, memory 75).

Read/write channel circuit 58 is connected to controller 54 through a plurality of read/write control channels 66, 68, 70 and 72. For example, in the illustrated embodiment, read control channel 70 is enabled when data is to be read from disk 12, and write control channel 72 is enabled when the data is to be written to disk 12. Read/write channel circuit 58 and controller 54 are also connected to a motor control circuit 74 adapted to control VCM 36 and spindle motor 14.

Figure 3:
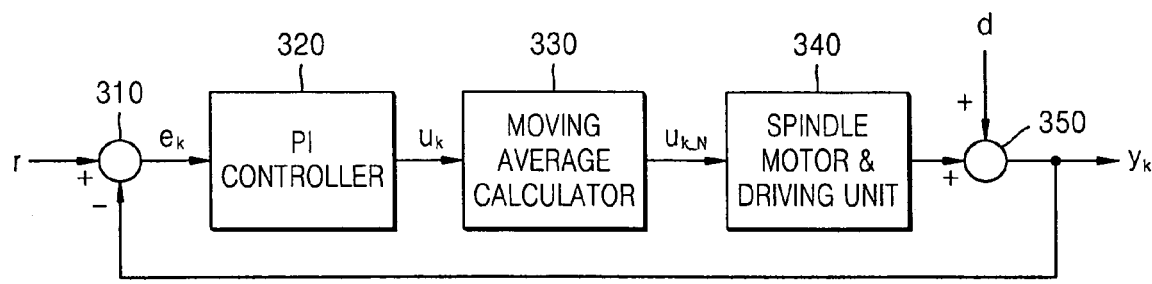
FIG. 3 is a block diagram of an apparatus for compensating for the mechanical tolerance of the brushless DC motor according to an embodiment of the present invention.

FIG. 3 illustrates a moving average control apparatus adapted controlling spindle motor 14. In one embodiment the moving average control apparatus may be implemented within the motor control circuit 74.

Referring to FIG. 3, a mechanical tolerance compensating apparatus for a brushless DC motor according to an embodiment of the present invention may comprise a subtractor 310, a proportional and integral (PI) controller 320, a moving average calculator 330, a spindle motor & driving unit 340, and an adder 350. However, the present invention is not limited to only the use of PI controller 320, but may be otherwise implemented using equivalent means, including alternate software and/or hardware designs. In foregoing embodiment, adder 350 receives a disturbance control signal "d" indicating a degree of disturbance experienced by spindle motor 14.

Figure 5:
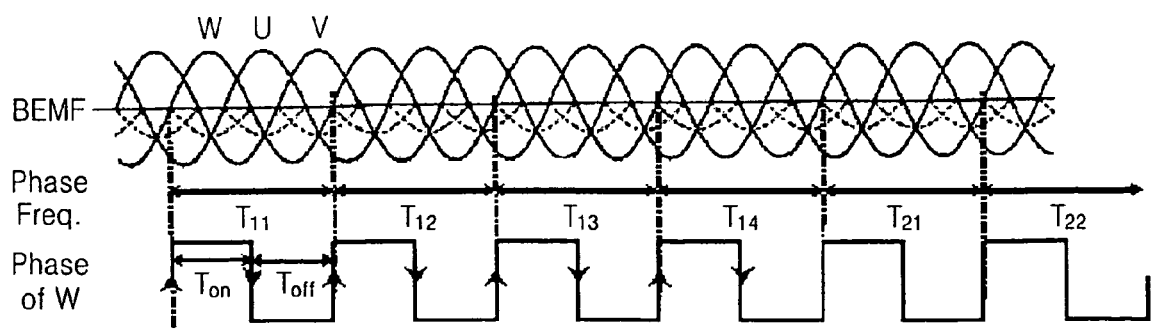
FIG. 5 is a waveform diagram for illustrating processes of generating phase signals using a back electromotive force of a spindle motor according to an embodiment of the present invention.

FIG. 5 illustrates an exemplary back electromotive force generated by spindle motor 14, and corresponding phase signals. Each phase signal is generated in relation to one phase of spindle motor 14. The frequency of each phase signal is proportional to the number of poles of the permanent magnet forming spindle motor 14, as well as the rotational speed of spindle motor 14. Therefore, the feedback sampling frequency may be increased to the number of maximum poles associated with the permanent magnet. That is, if the number of poles of the permanent magnet in the motor is eight, four positive edges and four negative edges are generated, and thus, eight phase changes are generated. Therefore, the motor can be controlled eight times corresponding to the number of phase changes in this particular example.

However, the magnetized poles are not regularly spaced due to the mechanical tolerance of the permanent magnet. Thus, if the sampling frequency is increased, a false speed error may be generated. That is, a driving speed may be indicated as being slower or faster than a reference speed due to the false speed error even when spindle motor 14 is running at a constant speed.

In addition, if the speed of spindle motor 14 is controlled each rotation of the disk, the mechanical tolerance of the motor is compensated for and does not affect the system. However, if the system is insensitive to changes in the rotational speed of the disk due to a low sampling frequency, accurate control operations cannot be performed.

Accordingly, embodiments of the invention provide a method of controlling the rotational speed of the disk two or more times per rotation by improving an inherent sampling frequency and thereby minimizing the effect of the false speed errors generated due to a mechanical tolerance of the motor.

According to one embodiment of the invention, a control system controls the rotational speed of the disk four times per rotation of the disk. That is, referring to FIG. 5, control sections T11~T14 correspond to one rotation of the disk, and a speed error is detected during each section T11, T12, T13, or T14 so the speed can be controlled four times per rotation of the disk.

If the sampling frequency is increased without adopting an algorithm that compensates for the mechanical tolerance, the sample periods allocated to the control sections T11, T12, T13, . . . of FIG. 5 are different from each other due to the mechanical tolerance of the permanent magnet in the motor even when the disk rotates at a constant speed. The system is thus controlled (i.e., affected) over differing time lengths. In addition, the duration of Ton and Toff are different from each other. When the duration of the control sections are different regardless of the constant rotation speed, the false speed error is generated, and thus, fine oscillation is generated in the motor.

In an embodiment of the present invention, the false speed error generated due to the mechanical tolerance of the motor is reduced using the following moving average compensation scheme.

When the spindle motor rotates, the speed ($y_k$) of the spindle motor is detected in each of the control sections, and then, the detected speed ($y_k$) is applied to subtractor 310. For example, the speed ($y_k$) of the spindle motor in the section Ti 1 of the phase signal may be determined by counting the number of pulses of an inner clock signal generated during the control section T11.

Subtractor 310 outputs a speed error (ek) by subtracting the speed (yk) of the spindle motor detected by the control section from a reference speed (r) that is initially set.

Then, PI controller 320 generates an input signal (uk) for controlling the spindle motor using the following equation 1.

$$\mu_k = K_P \cdot \epsilon_k + K_I \Sigma \epsilon_k + K_{FF} \quad (1)$$

Here, KP denotes a proportional gain constant, KI denotes an integral gain constant, and KFF denotes a feedforward constant.

The input signal (uk), generated by PI controller 320 to control the spindle motor using information obtained in the control periods, is applied to moving average calculator 330.

Figure 4:
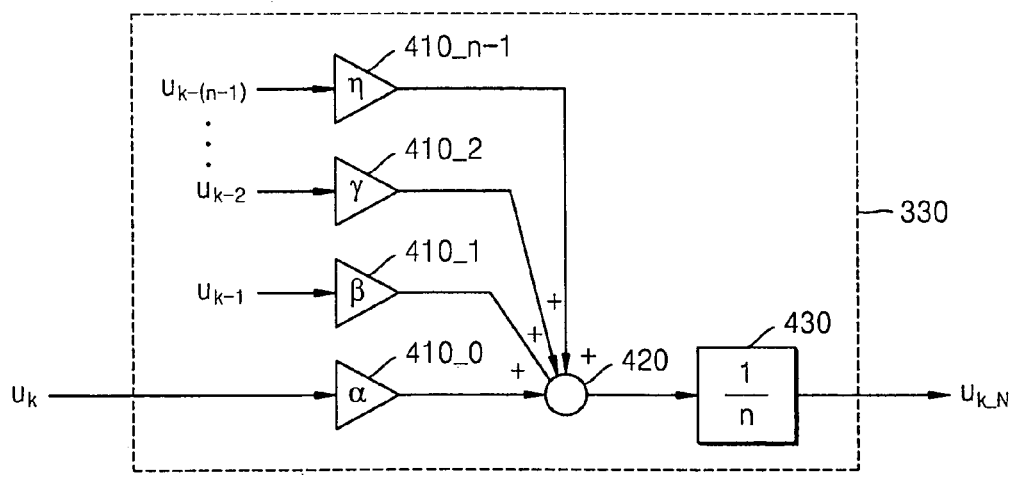
FIG. 4 is a detailed block diagram of a moving average calculator shown in FIG. 3.

FIG. 4 illustrates in some additional detail an exemplary moving average calculator 330 of FIG. 3. Referring to FIG. 4, moving average calculator 330 includes a plurality of multipliers 410_0, 410_1, 410_2, ..., 410_n-1, an adder 420, and a divider 430. A moving average calculator 330 such as the one illustrated in FIG. 4 may be used to implement the calculation shown in equation 2.

$$u_{k\_N} = \frac{\alpha \cdot u_k + \beta \cdot u_{k-1} + \gamma \cdot u_{k-2} + \ldots + \eta \cdot u_{k-(n-1)}}{n} \quad (2)$$

Multipliers ($\alpha, \beta, \gamma, \ldots, \eta$) of the plurality of multipliers 410_0, 410_1, 410_2, ..., 410_n-1 denote weights. Thus, if the values of the multipliers are set to 1, a general moving average value may be calculated. However, if the values of the multipliers ($\alpha, \beta, \gamma, \ldots, \eta$) are different from each other, a weighted moving average value may be calculated.

In particular, when the weighted moving average value is calculated, weights allocated to the more recently generated input signals may be larger than those allocated to the previously generated input signals. That is, the multipliers may satisfy a relation of $\alpha \geq \beta \geq \gamma \geq \ldots \geq \eta$.

Moving average calculator 330 may be used to calculate either the simple moving average value or the weighted moving average value.

The number of control input signals used to calculate the moving average can be appropriately determined according to a calculating speed of the system, a target speed of the motor, and a response speed of the disturbance through experiments. That is, the duration of a moving average section, in which the moving average value of the spindle motor control input signal (uk) is calculated, may be determined as a multiple of the duration of the period, in which the spindle motor rotates once.

Accordingly, spindle motor & driving unit 340 generates a driving voltage corresponding to the moving average value (uk_N) of the control input signals calculated by moving average calculator 330 to drive the spindle motor.

As described above, the average of the control input signals in the sections in which the false speed errors repeatedly occur is used as a final control signal, and thus, the false error that is repeatedly generated due to the mechanical tolerance can be reduced. The principle of the above operation is equivalent to that of compensating for the false error generated due to the mechanical tolerance in a case where the speed of the motor is controlled once per rotation of the motor.

Table 1 below illustrates values of spin jitters in a case where the moving average calculation algorithm (MA) used to calculate the moving average of the control input signals according to an embodiment of the present invention is applied and in a case where the MA is not applied.

TABLE 1

|  | Not using MA (conventional art) | Using MA (present invention) |
|---|---|---|
| HDD #1 | 273 | 160 |
| HDD #2 | 278 | 200 |
| HDD #3 | 378 | 150 |
| HDD #4 | 285 | 150 |
| HDD #5 | 295 | 210 |
| average | 302 | 174 |

In Table 1, the spin jitter is a scattered range, in which start of an index signal section that is detected once per rotation of the disk is measured 200 times and measurements are accumulated, and the unit of the spin jitter is nsec.

Referring to Table 1, in a case where the MA according to an embodiment of the present invention is used, the obtained spin jitter average is 174 nsec, and in a case where the MA of the present invention is not used, the obtained spin jitter average is 302 nsec. Therefore, when the MA of the embodiment is used, the spin jitters can be reduced greatly, and thus, the performance of controlling the spindle motor can be significantly improved.

Embodiments of the invention may be implemented as a control method, a related apparatus or system. When the present invention is implemented in software, wholly or in part, resulting segments of executable code may be used to perform constituent operations. Such executable code segments may be stored in a processor readable medium, or can be transmitted by computer data signals combined with carrier wave in a transmission medium or a network. The processor readable medium can be any medium that can store or transmit information, for example, an electronic circuit, a semiconductor memory device, a read only memory (ROM), a flash memory, an erasable ROM (EROM), a floppy disk, an optical disk, a hard disk, an optical fiber medium, and a radio frequency (RF) network. The computer data signal can be any signal that can be transmitted on the transmission medium such as an electronic network channel, an optical fiber, air, an electronic field, or an RF network.

While the present invention has been particularly shown and described with reference to exemplary embodiments thereof, it will be understood by those of ordinary skill in the art that various changes in form and details may be made therein without departing from the scope of the present invention as defined by the following claims. That is, the present invention can be applied to various kinds of disk drives including HDD, and can be applied to various kinds of data storing media.

What is claimed is:

1. An apparatus compensating for a mechanical tolerance of a motor, the apparatus comprising:
 a speed controller calculating a speed error based on a difference between a measured motor speed in each one of a plurality of control sections using a back electromotive force generated by the motor and a reference speed, and generating a plurality of motor control input signals in relation to the speed error;
 a moving average calculator calculating a moving average value of the plurality of motor control input signals over a moving average section including recently generated motor control input signals whenever the motor control input signal is generated; and a motor driver generating a driving motor current in relation to the moving average value to compensate for the mechanical tolerance of the motor, wherein the plurality of control sections are defined within a single rotation period of the motor.

2. The apparatus of claim 1, wherein the motor comprises a brushless Direct Current (DC) motor.

3. The apparatus of claim 1, wherein the motor control input signal is generated by applying the speed error for each one of the plurality of control sections to a proportional and integral (PI) controller.

4. The apparatus of claim 1, wherein the duration of a period used by the moving average calculator to calculate the moving average is determined in relation to a rotational period for the motor.

5. The apparatus of claim 1, wherein the moving average calculator comprises:
a plurality of multipliers adapted to multiply a plurality of the motor control input signals obtained from a moving average section by predetermined weights and output corresponding results whenever the motor control input signal is input;
an adder adapted to combine outputs of the plurality of multipliers and generate a sum; and
a divider dividing the sum of the adder by a number of motor control input signals obtained from the moving average section, and outputting the divided value.

6. The apparatus of claim 5, wherein respective values for the predetermined weights are determined by the plurality of multipliers such that the plurality of motor control input signals are multiplied by different weights.

7. The apparatus of claim 5, wherein respective values for the predetermined weights are determined by the plurality of multipliers so that recently generated motor control input signals are weighted more than previously generated motor control input signals.

8. A method of compensating for a mechanical tolerance of a motor, the method comprising:
generating a plurality of motor control input signals using a back electromotive force generated by the motor, wherein each rotational period for the motor is divided into a plurality of control sections, and a motor control input signal is generated in each one of the plurality of control sections;
calculating a moving average value of the motor control input signals over a moving average section including recently generated motor control input signals whenever the motor control input signal is generated; and
driving the motor using an electric current corresponding to the moving average value to compensate for the mechanical tolerance of the motor.

9. The method of claim 8, wherein the motor comprises a brushless Direct Current (DC) motor.

10. The method of claim 8, wherein the motor control input signal is generated by applying a speed error defined by a difference between a motor speed measured in each one of the plurality of control sections according to phase signals generated by the back electromotive force and a reference speed to a controller.

11. The method of claim 8, wherein the duration of the moving average section is determined in relation to the rotational period of the motor.

12. The method of claim 8, wherein the moving average value is obtained by multiplying the plurality of motor control input signals included in the moving average section by different weights.

13. The method of claim 12, wherein the moving average value is obtained by weighting recently generated motor control input signals more heavily than previously generated motor control input signals.

14. A hard disk drive (HDD) comprising:
a disk storing data;
a spindle motor rotating the disk and generating a back electromotive force;
a spindle motor speed controller calculating a speed difference between a measured motor speed in each one of a plurality of control sections using the back electromotive force generated by the spindle motor and a reference speed, and generating a plurality of spindle motor control input signals in relation to the speed error,
wherein the plurality of control sections are defined within a single rotational period of the motor;
a moving average calculator calculating a moving average value of the plurality of spindle motor control input signals over a moving average section including recently generated spindle motor control input signals whenever the spindle motor control input signal is generated; and
a spindle motor driver generating a driving motor current corresponding to the moving average value to compensate for the mechanical tolerance of the motor.

15. The HDD of claim 14, wherein the spindle motor comprises a brushless Direct Current (DC) motor.

16. The HDD of claim 14, wherein the duration of the moving average section is determined in relation to the rotational period of the motor.

17. The HDD of claim 14, wherein the moving average value is obtained by multiplying the plurality of spindle motor control input signals included in the moving average section by different weights.

18. The HDD of claim 17, wherein the moving average value is obtained by weighting recently generated spindle motor control input signals more heavily than previously generated spindle motor control input signals.

* * * * *